United States Patent
Martin et al.

(10) Patent No.: US 7,965,276 B1
(45) Date of Patent: Jun. 21, 2011

(54) FORCE OUTPUT ADJUSTMENT IN FORCE FEEDBACK DEVICES BASED ON USER CONTACT

(75) Inventors: Kenneth M. Martin, Los Gatos, CA (US); Adam C. Braun, Sunnyvale, CA (US); David F. Moore, Redwood City, CA (US)

(73) Assignee: Immersion Corporation, San Jose, CA (US)

( * ) Notice: Subject to any disclaimer, the term of this patent is extended or adjusted under 35 U.S.C. 154(b) by 1616 days.

(21) Appl. No.: 09/798,872

(22) Filed: Mar. 1, 2001

Related U.S. Application Data

(60) Provisional application No. 60/188,334, filed on Mar. 9, 2000.

(51) Int. Cl.
*G09G 5/08* (2006.01)
*G09G 5/00* (2006.01)

(52) U.S. Cl. .................. 345/161; 345/184; 345/156

(58) Field of Classification Search ........... 345/156–184
See application file for complete search history.

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,902,687 A | 9/1975 | Hightower | |
| 3,903,614 A | 9/1975 | Diamond et al. | |
| 4,160,508 A | 7/1979 | Salsbury et al. | |
| 4,236,325 A | 12/1980 | Hall et al. | |
| 4,513,235 A | 4/1985 | Acklam et al. | |
| 4,581,491 A | 4/1986 | Boothroyd | |
| 4,599,070 A | 7/1986 | Hladky et al. | |
| 4,708,656 A | 11/1987 | De Vries et al. | |
| 4,713,007 A | 12/1987 | Alban | |
| 4,891,764 A | 1/1990 | McIntosh | |
| 4,930,770 A | 6/1990 | Baker | |

(Continued)

FOREIGN PATENT DOCUMENTS

EP 0349086 1/1990

(Continued)

OTHER PUBLICATIONS

Baigrie, "Electric Control Loading—A Low Cost, High Performance Alternative," Proceedings, pp. 247-254, Nov. 6-8, 1990.

(Continued)

*Primary Examiner* — Kevin M Nguyen
(74) *Attorney, Agent, or Firm* — Kilpatrick Townsend & Stockton LLP

(57) ABSTRACT

A method and apparatus for adjusting force output from force feedback devices based on user contact with the device. A degree of user contact with a manipulandum of the device is determined by examining the motion of the manipulandum in at least one degree of freedom. A force is output in the degree of freedom of the manipulandum by an actuator of the force feedback device, where a magnitude of the force is adjusted in accordance with the degree of user contact. The force output can be stopped if the user is not contacting the manipulandum, or the forces can be reduced in magnitude if the user has a light contact or reduced grip on the manipulandum. The device can also continue to monitor manipulandum motion to determine when the user is again interacting with the manipulandum and to reapply or increase the magnitude of the forces.

23 Claims, 11 Drawing Sheets

U.S. PATENT DOCUMENTS

| | | | |
|---|---|---|---|
| 4,934,694 | A | 6/1990 | McIntosh |
| 5,019,761 | A | 5/1991 | Kraft |
| 5,022,407 | A | 6/1991 | Horch et al. |
| 5,035,242 | A | 7/1991 | Franklin |
| 5,038,089 | A | 8/1991 | Szakaly |
| 5,078,152 | A | 1/1992 | Bond |
| 5,186,695 | A | 2/1993 | Mangseth et al. |
| 5,212,473 | A | 5/1993 | Louis |
| 5,240,417 | A | 8/1993 | Smithson et al. |
| 5,271,290 | A | 12/1993 | Fischer |
| 5,275,174 | A | 1/1994 | Cook |
| 5,299,810 | A | 4/1994 | Pierce |
| 5,309,140 | A | 5/1994 | Everett |
| 5,334,027 | A | 8/1994 | Wherlock |
| 5,466,213 | A | 11/1995 | Hogan |
| 5,547,382 | A | 8/1996 | Yamasaki |
| 5,739,811 | A * | 4/1998 | Rosenberg et al. ............ 345/161 |
| 5,766,016 | A | 6/1998 | Sinclair |
| 5,785,630 | A | 7/1998 | Bobick et al. |
| 5,825,308 | A * | 10/1998 | Rosenberg ....................... 341/20 |
| 6,005,551 | A * | 12/1999 | Osborne et al. ................ 345/161 |
| 6,061,004 | A * | 5/2000 | Rosenberg ....................... 341/20 |
| 6,111,577 | A | 8/2000 | Zilles et al. |
| 6,219,033 | B1 * | 4/2001 | Rosenberg et al. ............ 345/157 |
| 6,252,583 | B1 * | 6/2001 | Braun et al. ................... 345/156 |
| 6,388,655 | B1 * | 5/2002 | Leung ............................. 345/157 |
| 6,422,941 | B1 | 7/2002 | Thorner et al. |
| 6,429,846 | B2 * | 8/2002 | Rosenberg et al. ............ 345/156 |
| 6,686,901 | B2 * | 2/2004 | Rosenberg ..................... 345/156 |

FOREIGN PATENT DOCUMENTS

| | | |
|---|---|---|
| JP | H2-185278 | 7/1990 |
| JP | H4-8381 | 1/1992 |
| JP | H5-192449 | 8/1993 |
| JP | H7-24147 | 1/1995 |

OTHER PUBLICATIONS

Iwata, "Pen-based Haptic Virtual Environment," 0-7803-1363-1/93 IEEE, pp. 287-292, 1993.

Russo, "The Design and Implementation of a Three Degree of Freedom Force Output Joystick," MIT Libraries Archives Aug. 14, 1990, pp. 1-131, May 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4819 Springer International (Springer-Vertag); Experimental Brain Research, vol. 79, No. 1, pp. 150-156, 1990.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Snow et al., "Model-X Force-Reflecting-Hand-Controller," NT Control No. MPO-17851; JPL Case No. 5348, pp. 1-4, Jun. 15, 1989.

Ouh-Young, "Force Display in Molecular Docking," Order No. 9034744, p. 1-369, 1990.

Tadros, Control System Design for a Three Degree of Freedom Virtual Environment Simulator Using Motor/Brake Pair Actuators, MIT Archive© Massachusetts Institute of Technology, pp. 1-88, Feb. 1990.

Caldwell et al., "Enhanced Tactile Feedback (Tele-Traction) Using a Multi-Functional Sensory System," 1050-4729/93, pp. 955-960, 1993.

Adelstein, "Design and Implementation of a Force Reflecting Manipulandum for Manual Control research," DSC-vol. 42, Advances in Robotics, Edited by H. Kazerooni, pp. 1-12, 1992.

Gotow et al, "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSV-vol. 42, Advances in Robotics, pp. 55-61, ASME 1992.

Russo, "Controlling Dissipative Magnetic Particle Brakes in Force Reflective Devices," DSC-vol. 42, Advances in Robotics, pp. 63-70, ASME 1992.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Adelstein, "A Virtual Environment System for the Study of Human Arm Tremor," Ph.D. Dissertation, Dept. of Mechanical Engineering, MIT, Jun. 1989.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings of Fourth CISM-IFToMM, Sep. 8-12, 1981.

McAffee, "Teleoperator Subsystem/Telerobot Demonsdtrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Textue for a Force-Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21-23, 1991.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

IBM Technical Disclosure Bullein, "Mouse Ball-Actuating Device With Force and Tactile Feedback," vol. 32, No. 9B, Feb. 1990.

Terry et al., "Tactile Feedback In A Computer Mouse," Proceedings of Fourteenth Annual Northeast Bioengineering Conference, University of New Hampshire, Mar. 10-11, 1988.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR—A Haptic display for speech perception by deaf and def-blind individuals," IEEE Virtual Reality Annual International Symposium, Seattle, WA, Sep. 18-22, 1993.

Rabinowitz et al., "Multidimensional tactile displays: Identification of vibratory intensity, frequency, and contractor area," Journal of The Accoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy et al., "A Laboratory Breadboard System for Dual-Arm Teleoperation," SOAR '89 Workshop, JSC, Houston, TX, Jul. 25-27, 1989.

Ouh-Young, "A Low-Cost Force Feedback Joystick and Its Use in PC Video Games," IEEE Transactions on Consumer Electronic, vol. 41, No. 3, Aug. 1995.

Marcus, "Touch Feedback in Surgery," Proceedings of Virtual Reality and Medicine The Cutting Edge, Sep. 8-11, 1994.

Bejczy, et al., "Universal Computer Control System (UCCS) for Space Telerobots," CH2413-3/87/0000/0318501.00 1987 IEEE, 1987.

Aukstakalnis et al., "Silicon Mirage: The Art and Science of Virtual Reality," ISBN 0-938151-82-7, pp. 129-180, 1992.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction, vol. 7, No. 1, pp. 1-24, 1995.

Pimentel et al., "Virtual Reality: through the new looking glass," $2^{nd}$ Edition; McGraw-Hill, ISBN 0-07-050167-X, pp. 41-202, 1994.

"Cyberman Technical Specification," Logitech Cyberman SWIFT Supplement, Apr. 5, 1994.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Kaczmarek et al., "Tactile Displays," Virtual Environment Technologies.

"Taking a Joystick Ride", Computer Currents, Tim Scannell, Nov. 1994, Boston Edition, vol. 9 No. 11.

"Coaxial Control Shaker Part No. C-25502," Safe Flight Instrument Corporation, 26 pages, Jul. 1, 1967; Revised Jan. 28, 2002.

* cited by examiner

FORCE OUTPUT ADJUSTMENT IN FORCE FEEDBACK DEVICES BASED ON USER CONTACT

CROSS REFERENCE TO RELATED APPLICATIONS

This application claims the benefit of U.S. Provisional Application No. 60/188,334, filed Mar. 9, 2000, entitled, "Force Output Adjustment in Force Feedback Devices," which is incorporated herein by reference in its entirety.

BACKGROUND OF THE INVENTION

The present invention relates generally to interface devices for allowing humans to interface with computer systems, and more particularly to low-cost computer interface devices that allow the user to provide input to computer systems and allow computer systems to provide force feedback to the user.

A user can interact with an environment displayed by a computer to perform functions and tasks on the computer, such as playing a game, experiencing a simulation or virtual reality environment, using a computer aided design system, operating a graphical user interface (GUI), navigate web pages, etc. Common human-computer interface devices used for such interaction include a mouse, joystick, trackball, gamepad, steering wheel, stylus, tablet, pressure-sensitive sphere, or the like, that is connected to the computer system controlling the displayed environment. Typically, the computer updates the environment in response to the user's manipulation of a physical manipulandum such as a joystick handle or mouse, and provides visual and audio feedback to the user. The computer senses the user's manipulation of the user object through sensors provided on the interface device that send locative signals to the computer.

In some interface devices, force (kinesthetic) feedback is also provided to the user. These types of interface devices can provide physical sensations which are felt by the user manipulating a user manipulandum of the interface device, such as a joystick handle, mouse, steering wheel, trackball, etc. One or more motors or other actuators are coupled to the manipulandum and are connected to the controlling computer system. The computer system controls forces on the manipulandum in conjunction and coordinated with displayed events and interactions by sending control signals or commands to the actuators. The computer system can thus convey physical force sensations to the user in conjunction with other supplied feedback as the user is grasping or contacting the manipulandum of the interface device.

While kinesthetic force feedback devices offer much to enrich a user's experience, they present many issues as well. One of the difficulties with these types of devices is directly related to how the user manipulates the device. When the user is gripping the manipulandum at full grasping strength, full scale forces can be output to the user with the intended effect. However, if the user is not gripping the manipulandum, the forces will generate undesirable motion on the manipulandum. For example, if the user temporarily rests a hand-held force feedback device on a table and leaves it there, and the manipulandum is still moving from applied forces, the device can bounce around from the motion. For some larger devices, outputting forces and unexpected motion when there is no user contact can also be a safety concern. In other cases, if the user is gripping or contacting the manipulandum very lightly, the forces are of too great a strength and cause too much motion of the manipulandum and/or cause distracting and non-immersive forces on the user. The undesired motion is accentuated if the manipulandum is designed to generate high force output levels for compelling force sensations.

Traditionally, these problems have been partially solved through the use of a "deadman" sensor or switch. The deadman sensor is used to detect when the user is gripping or in contact with the device that is being operated. When the user contact with the manipulandum is detected, the commanded forces are output to the device. However, if the user breaks contact with the manipulandum or device, the force output is stopped until the user makes contact again, at which point the forces resume output if they are still being commanded to play. In some embodiments, as described in U.S. Pat. Nos. 5,691,898 and 5,734,373, incorporated herein by reference, the force feedback device or host computer can slowly ramp up the force magnitudes when the forces resume playing after the user re-contacts the device. This prevents the manipulandum from immediately jerking or moving unpredictably as the user makes contact and allows the user some time to establish a complete, firm grip or contact.

The sensors typically used for deadman operation in a force feedback device are optical sensors. For example, the one type includes a phototransistor detector paired with a light-emitting diode (LED) emitter. In many cases, the LED is pulsed with a known driving signal and the same form (frequency, etc.) of signal must be detected at the detector for a positive detection to have occurred. The pulsing method prevents false triggering levels that may be caused by ambient light in the device's environment. Other optical sensors may include a detector only, which detects skin tone of the user or ambient light. Other types of sensors that can also be used as deadman sensors include capacitive sensors, physical switches or buttons, etc.

The use of this type of deadman sensor is often a good solution for the problem of undesirable motion of a manipulandum that is not being contacted by the user. It works very well to arrest the motion of the manipulandum when the user releases the manipulandum. However, this form of deadman operation has some drawbacks. Since an additional sensor must be added to the device, the overall cost and complexity of the force feedback system is increased. Further, since the sensor will in many cases require support electronics, additional print circuit board space will be required and could possibly increase the size of the force feedback device. Also, the wire routing and assembly for a deadman sensor placed in a moving manipulandum is more complex. For some devices it may be difficult to locate the sensor in a "universal" position on the manipulandum or housing, i.e. a location that will allow the sensor to be activated by the nominal grasping position of all users, especially for smaller devices such as gamepads. Also, there are times where the user may be driven off of the sensor by the motion of the device itself. In these cases, the device may falsely detect deactivations during operation.

In addition, other problems are not at all addressed by existing deadman sensors. The user may be gripping the manipulandum at different strengths during operation of the force feedback device. Forces that feel excellent for a stronger grip may feel far too strong when the player is gripping the manipulandum more lightly, thus causing the user's experience to be downgraded. Existing deadman sensors do not sense the degree of a user's touch, and thus cannot compensate for different degrees of user contact.

SUMMARY OF THE INVENTION

A method and apparatus is described which monitors motion of the manipulandum of a force feedback device caused by a user. Based on the motion of the manipulandum, the degree of contact of the user with the manipulandum is determined. The device can reduce the level of or stop the force output on the manipulandum if the user has lesser contact with or is not contacting the manipulandum. The device can also monitor manipulandum motion over time to determine when the user is again interacting with the manipulandum and to reapply or increase the magnitude of the forces.

More particularly, a method is described for providing force feedback to a user based on user contact with the force feedback device, where the force feedback is produced by a force feedback interface device coupled to a host computer. The force feedback device includes a manipulandum that is moveable by the user in at least one degree of freedom. Motion of the manipulandum by the user is sensed and sensor data indicative of the motion are provided to the host computer. A degree of user contact with the manipulandum is determined by examining the motion of the manipulandum in the degree of freedom. A force is output in the degree of freedom of the manipulandum by an actuator of the force feedback device, where a magnitude of the force is adjusted in accordance with the degree of user contact. The output of the force can be stopped entirely if no user contact with the manipulandum is detected.

In some embodiments, determining the degree of user contact consists of detecting that the user is either contacting the manipulandum or is not contacting the manipulandum, and the force is either output at full strength when the user is contacting the manipulandum, or stopped entirely when the user is not contacting the manipulandum. In other embodiments, the determining of the degree of user contact includes detecting a variable degree of contact of the user with the manipulandum, and the adjustment of the force includes scaling the magnitude of the force in accordance with the degree of contact of the user.

The examining of motion of the manipulandum can include comparing motion of the manipulandum sensed by the sensor device with predicted motion of the manipulandum based on a model of motion of the manipulandum. Alternatively, the examining of motion can include determining a velocity of the manipulandum in the at least one degree of freedom, where the force magnitude is adjusted if a significant change in the velocity is detected. Or, the force magnitude can be adjusted if high frequency oscillations, or a high velocity, of the manipulandum in the degree of freedom are detected, which can be indicative of instability of the manipulandum. Some embodiments can examine the velocity of the manipulandum, where a high velocity indicates the actuators are moving the manipulandum without user contact.

The output of a force sensation can be resumed after the force output is stopped if user contact with the manipulandum is detected at a later time. To re-detect user contact, the process can check for any motion of the manipulandum while the force is stopped, or the process can apply a test force to the manipulandum while the force is stopped and examine a test motion of the manipulandum resulting from the test force. In embodiments providing force magnitude scaling, the method can continually check if the degree of user contact has changed from the previously detected level and to change the scaling of forces in accordance with the new degree of contact, if appropriate. A force feedback device of the present invention can include a processor that can perform many of the method steps described above.

The method and apparatus of the present invention allow output forces on a manipulandum of a force feedback device to be changed in accordance with user physical contact and interaction with the manipulandum. The present invention provides features associated with a traditional deadman sensor, such as deactivating forces output by the actuators when the user is not contacting the manipulandum. The present invention also can provide scaling of force output in accordance with the degree of user contact with the manipulandum, leading to a more compelling user experience of force feedback. The present invention provides all this functionality using existing position sensors, without the requirement of a dedicated deadman switch, force sensor, or other type of sensor component, thus reducing the component cost to manufacture the force feedback device.

These and other advantages of the present invention will become apparent to those skilled in the art upon a reading of the following specification of the invention and a study of the several figures of the drawing.

BRIEF DESCRIPTION OF THE DRAWINGS

FIG. 2b is a perspective view of a flexure gimbal mechanism suitable for use with the mechanical system of FIG. 2a;

DETAILED DESCRIPTION OF PREFERRED EMBODIMENTS

Figure 1:
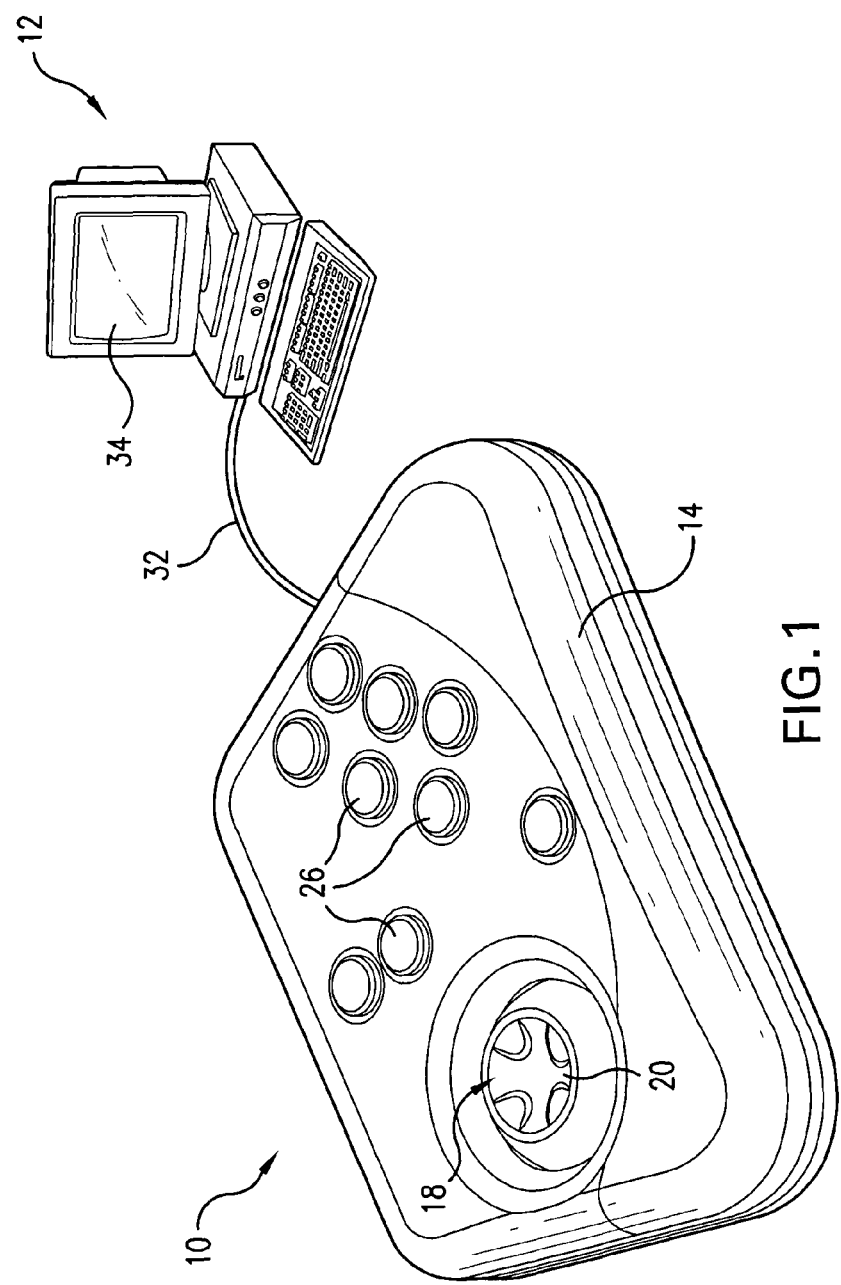
FIG. 1 is a perspective view of force feedback system suitable for use with the present invention, including a force feedback device connected to a host computer.

FIG. 1 is a perspective view of one example of a force feedback interface device 10 which can be used with the force adjustment features of the present invention. The device is used for interfacing a user with a computer generated environment implemented by a host computer 12.

Interface device 10 of the described embodiment is in the form of a handheld controller, of similar shape and size to many "gamepads" currently available for video game console systems. A housing 14 of the interface device 10 is shaped to easily accommodate two hands gripping the device. In the described embodiment, the user accesses the various controls on the device 10 with his or her fingers. In alternate embodiments, the interface device can take a wide variety of forms, including peripheral devices that rest on a tabletop or other surface, stand-up arcade game machines, laptop devices or other devices worn on the person, etc.

A user manipulatable object 18 (or "manipulandum") such as a force feedback pad 20 is included in device 10 that is accessible through the top surface of the housing 14 to be manipulated by the user in one or more degrees of freedom. In the preferred embodiment, the pad 20 is a top portion of a semi-spherical member that can be rotated in place by the user in two rotary degrees of freedom. The user can use a thumb or finger to manipulate the pad 20. The surface of the pad 20 can be textured or provided with a frictional material to allow the user's finger to achieve a firm grip on the pad.

Manipulandum 18 can be moved in two rotary degrees of freedom (e.g., forward/back and left/right, or combinations thereof). This motion is translated into input signals provided to the host computer 12, and the host 12 updates a displayed graphical environment or application program based on the input. Another embodiment of a sphere manipulandum that can be grasped at multiple points is described in detail in copending provisional application no. 60/133,208, incorporated herein by reference. In some embodiments, additional degrees of freedom can be provided, e.g., up and down along an axis approximately perpendicular to the top surface of the housing 14, a rotary "spin" degree of freedom about that perpendicular axis, etc.

In still other embodiments, a small joystick can be provided as the user manipulandum 18 instead of pad 20, where the joystick extends up from the housing and can include a top surface on which the user's finger is engaged. Such an embodiment is described in copending application Ser. No. 09/376,649, incorporated herein by reference in its entirety.

One or more buttons 26 are also preferably provided on the surface of the housing 14 of the device 10. Additionally, a traditional directional pad or "joypad" (not shown) can be provided to allow additional input from the user, where a single piece may be pressed in one or more places to provided input in four or eight directions, similar to pad 20. Other controls can also be provided on various locations of the device 10, such as a dial or slider for throttle control in a game, a four- or eight-way hat switch, knobs, trackballs, etc. Any of these controls can also be provided with force feedback, such as tactile feedback and/or kinesthetic feedback; for example, embodiments of buttons, direction pads, and knobs having force feedback are described in copending patent applications Ser. Nos. 09/156,802, filed Sep. 17, 1998, and 09/179,382, filed Oct. 26, 1998, all incorporated herein by reference in their entirety.

In yet other embodiments, a similar force feedback interface device can be implemented in other applications, such as a hand-held remote control device used to access the functions of a device or appliance remotely by a user (such as a television, video cassette recorder or DVD player, sound stereo, Internet or network computer connected to a television, etc.).

Interface device 10 is coupled to host computer 12 by a bus 32, which can be any of several types of communication media. For example, a serial interface bus, parallel interface bus, or wireless communication link can be used. Specific implementations can include Universal Serial Bus (USB), IEEE 1394 (Firewire), RS-232, IRDa, or other standards.

Host computer 12 is preferably a video game console, personal computer, workstation, set top box, appliance, or other computing or electronic device. For example, one of a variety of home video game systems, such as systems available from Nintendo, Sega, or Sony, can be used. Alternatively, personal computers, such as a PC-compatible or Macintosh computer, or a workstation, such as a Sun or Silicon Graphics workstation, can be used. In other embodiments, a television "set top box" or a "network computer", a portable computing device, etc. can be used. Or, the host 12 and device 10 can be included in a single housing, such as in an arcade game machine, portable computer, or other device. Host computer system 12 preferably implements a host application program with which a user is interacting via peripherals and interface device 10. For example, the host application program can be a video or computer game, medical simulation, scientific analysis program, operating system, graphical user interface, or other application program.

The host application preferably displays graphical images of the environment on a display device 34 connected to the host computer, such as a television, monitor, display goggles, LCD display, flat panel display, projection device, etc. The software and environment running on the host computer 12 may be of a wide variety. For example, the host application program can be a video game, simulation, graphical user interface (GUI), Web page or browser that implements HTML or VRML instructions, scientific analysis program, virtual reality training program or application, or other application program that utilizes input from the interface device 10 and (in force feedback embodiments) outputs force feedback commands to the controller 10. For example, many game application programs include force feedback functionality and may communicate with the force feedback interface device 10 using a standard protocol/drivers such as Touch-Sense™ available from Immersion Corporation of San Jose, Calif. Herein, computer 12 may be referred as displaying "graphical objects" or "entities." These objects are not physical objects, but are logical software unit collections of data and/or procedures that may be displayed as images by computer 12 on display screen 34, as is well known to those skilled in the art. A displayed cursor or a simulated cockpit of an aircraft might be considered a graphical object.

In operation, the controls of interface device 10 are manipulated by the user, which indicates to the computer how to update the implemented application program(s). An electronic interface included in housing 14 of device 10 can couple the device 10 to the computer 12. The host computer 12 receives the input from the interface device and updates an application program in response to the input. For example, a game presents a graphical environment in which the user controls one or more graphical objects or entities using the manipulandum 18 and other controls such as buttons 26. In addition, the host computer provides force feedback commands and data to the device 10 to cause force feedback to be output on manipulandum 18, as described below.

Figure 2A:
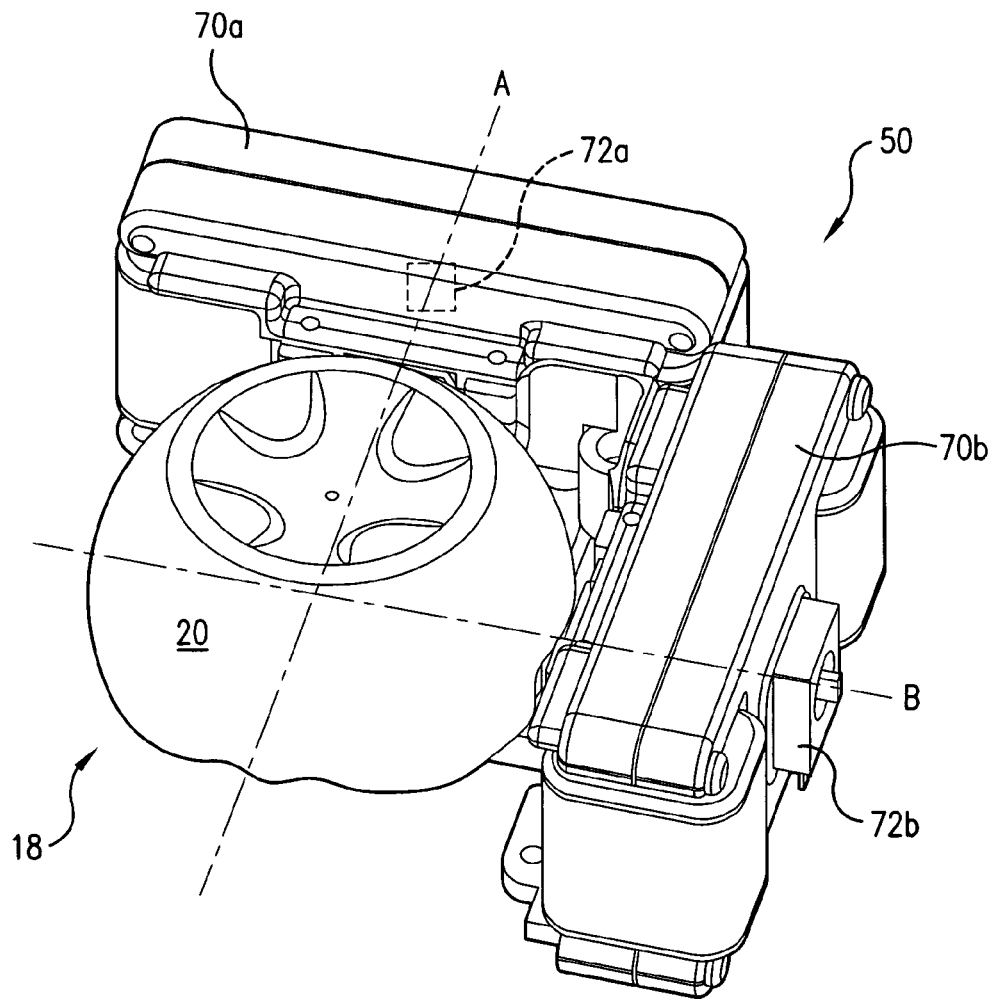
FIG. 2a is a perspective view of a mechanical system for use with the interface device of FIG. 1 and including a mechanism of the present invention.

FIG. 2*a* is a perspective view of an example of a mechanical system 50 of the present invention suitable for use with the interface device 10 of FIG. 1 or other types of interface devices. Manipulandum 18 (shown as force feedback pad 20) is shown coupled to a linkage mechanism (shown in FIG. 2*b*), and transducers 54 are coupled to the linkage mechanism to sense motion of and actuate the manipulandum 18. The linkage mechanism provides two rotary degrees of freedom to the manipulandum 18.

Transducers 54*a* and 54*b* are electronically controlled to sense motion of the manipulandum 18 in the two degrees of freedom, and to output forces on the manipulandum 18 in those degrees of freedom. In the described embodiment, transducer 54*a* includes an actuator 70*a* and a sensor 72*a*, and transducer 54*b* includes an actuator 70*b* and a sensor 72*b*. Transducer 54*a* senses motion and outputs forces in one degree of freedom, and transducer 54b senses motion and outputs forces in the other degree of freedom. Both transducers 54 are grounded, e.g. coupled to housing 14 or other ground member, which allows greater fidelity and accuracy in producing force sensations. The operation and structure of a mechanical system similar to system 50, and other similar embodiments, are described in greater detail in copending U.S. patent application Ser. No. 09/376,649, which is incorporated herein by reference.

Figure 2B:
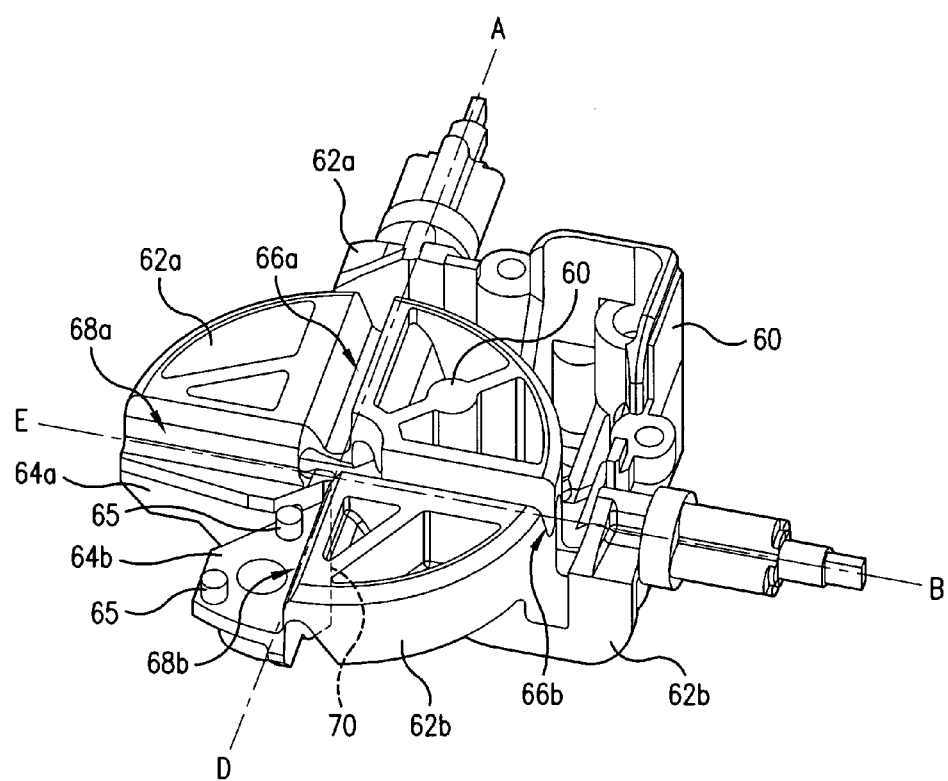

FIG. 2b is a perspective view of a flexure gimbal mechanism 52 suitable for use with the force feedback device of FIGS. 1 and 2a.

Gimbal mechanism 52 is a five-bar linkage which includes a plurality of members connected to each other in a closed loop through flexure couplings instead of rotating or sliding bearings. Gimbal mechanism 52 provides two rotary degrees of freedom to manipulandum 18, where the members of the gimbal mechanism are flexibly coupled to one another to allow a rotational motion with respect to each other. The gimbal mechanism 52 provides a multi-segment flexure (unitary member) in which the flexure couplings provide a flex compliance to allow the members of the linkage to rotate. Gimbal mechanisms similar to mechanism 52 are described in greater detail in copending application Ser. No. 09/376,649.

Gimbal mechanism 52 includes a ground member 60 that is provided as support and is rigidly coupled to a grounded surface (relative to the gimbal mechanism) such as the housing 14 of the device 10. Two extension members 62a and 62b are rotatably coupled to the ground member by flexure couplings 66a and 66b, respectively. A central member 64a is rotatably coupled to extension member 62a by a flexure coupling 68a, and a central member 64b is rotatably coupled to extension member 62b by a flexure coupling 68b. Central members 64a and 64b are rotatably coupled to each other at a flexure coupling 70 (extending from the bottom of the members 64a and 64b), where the manipulandum 18 is preferably coupled to one of the central members 64 (e.g. to the pegs 65 on the member 64b). The gimbal mechanism operates such that extension member 62a can rotate about a "base" axis A, central member 64b can rotate about a floating axis D, extension member 62b can rotate about base axis B, and central member 64a can rotate about floating axis E. The axes D and E are "floating" in the sense that these axes are not fixed in one position relative to ground as are axes A and B. The five-bar linkage is arranged such that extension member 62a and central member 64a can be rotated about axis A in a first degree of freedom, which causes central member 64b to rotate about axis D. Furthermore, extension member 62b and central member 64b can be rotated about axis B in a second degree of freedom, which causes central member 64a to rotate about axis E.

In other embodiments, many other types of mechanical systems can be used, including five-bar linkages having stiff members with rotary bearings or other types of bearings, slotted bail mechanisms, linear bearings, or other mechanisms well known to those skilled in the art. Furthermore, force amplification systems including capstan drives, belt drives, gear drives, etc. can be used. Some possible embodiments are described in greater detail in U.S. Pat. Nos. 5,731,804; 5,767,839; 5,805,140; 6,020,875; 5,825,308; and U.S. application Ser. Nos. 09/058,259; 08/965,720; 09/149,055; 09/179,382; and 60/172,953; all incorporated herein by reference.

Figure 2C:
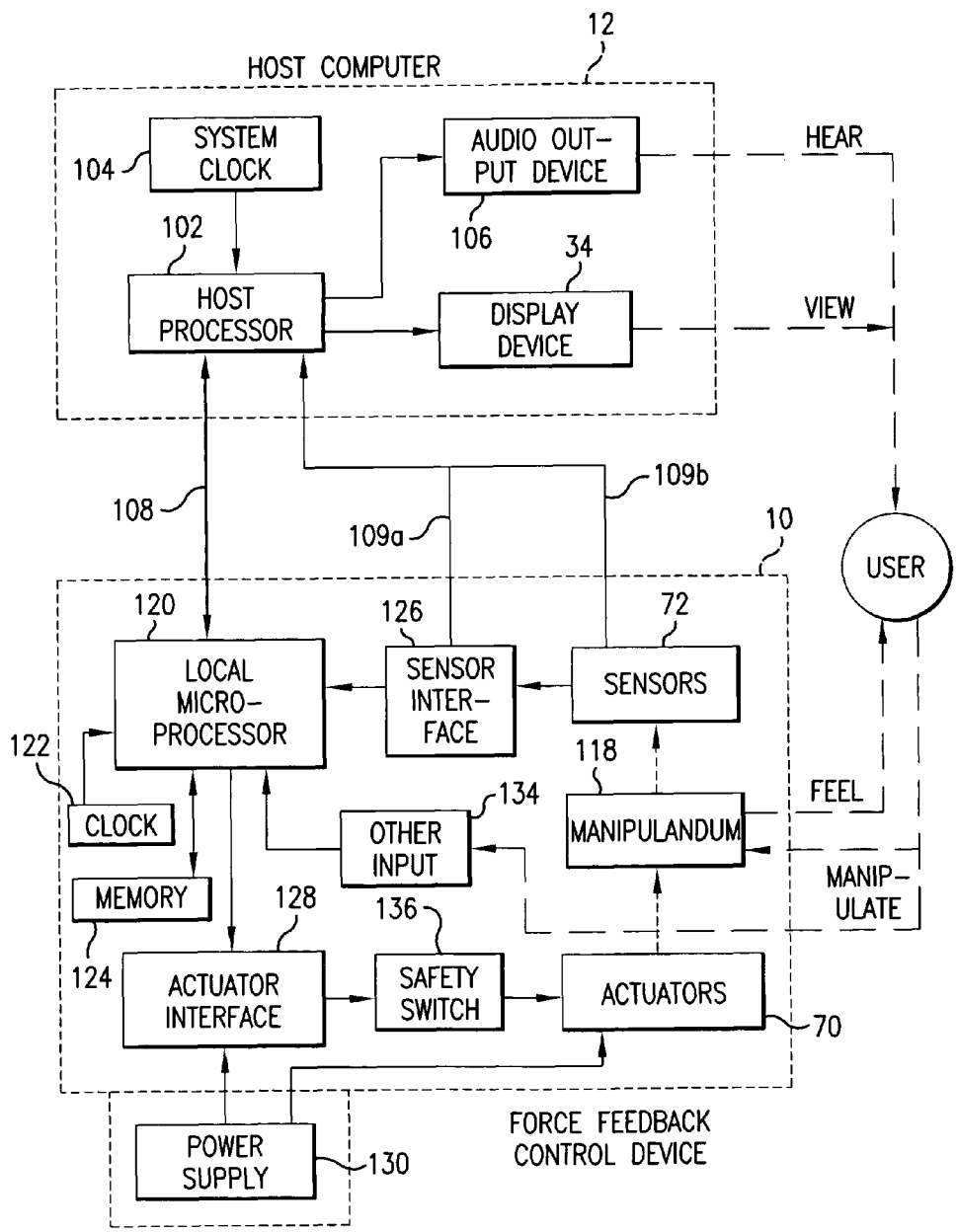
FIG. 2c is a block diagram illustrating the interface device and host computer for use with the present invention.

FIG. 2c is a block diagram illustrating one embodiment 100 of the force feedback system suitable for use with the present invention, and including a local microprocessor and a host computer system. A system similar to that of FIG. 2c is described in detail in U.S. Pat. No. 5,734,373 which is incorporated herein by reference in its entirety.

As explained with reference to FIG. 1, host computer 12 is a personal computer, video game console, workstation, or other computing or display device. Host computer 12 commonly includes a host microprocessor 102, a clock 104, a display device 34, and an audio output device 106. Host microprocessor 102 can include a variety of available microprocessors and can be single microprocessor chip, or can include multiple primary and/or co-processors and preferably retrieves and stores instructions and other necessary data from random access memory (RAM) and read-only memory (ROM) as is well known to those skilled in the art. Host computer 12 can receive sensor data or a sensor signal via bus 108 from sensors of device 10 and other information. Microprocessor 102 can receive data from bus 108 using I/O electronics, and can use the I/O electronics to control other peripheral devices. Host computer 12 can also output commands to interface device 10 via bus 108 to cause force feedback.

Clock 104 can be a standard clock crystal or equivalent component used by host computer 12 to provide timing to electrical signals used by host microprocessor 102 and other components of the computer 12 and can be used to provide timing information that may be necessary in determining force or position values. Display device 34 is described with reference to FIG. 1. Audio output device 106, such as speakers, can be coupled to host microprocessor 102 via amplifiers, filters, and other circuitry well known to those skilled in the art. Other types of peripherals can also be coupled to host processor 102, such as storage devices (hard disk drive, CD ROM drive, floppy disk drive, etc.), printers, and other input and output devices.

Interface device 10 is coupled to host computer 12 by bi-directional bus 108, which sends signals in either direction between host computer 12 and the interface device 10. Bus 108 can be a serial interface bus, such as USB, RS-232, or Firewire (IEEE 1394), providing data according to a serial communication protocol, a parallel bus using a parallel protocol, or other types of buses. An interface port of host computer 12, such as a USB or RS232 serial interface port, can connect bus 108 to host computer 12.

Interface device 10 can include a local microprocessor 120, local clock 122, local memory 124, sensor interface 126, and actuator interface 128. Device 10 may also include additional electronic components for communicating via standard protocols on bus 108.

Local microprocessor 120 preferably coupled to bus 108 and is considered "local" to device 10, where "local" herein refers to processor 120 being a separate microprocessor from any processors 102 in host computer 12. "Local" also preferably refers to processor 120 being dedicated to haptic feedback and sensor I/O of the device 10, and being closely coupled to sensors and actuators of the device 10, such as within the housing 14. Microprocessor 120 can be provided with software instructions to wait for commands or requests from computer host 12, parse/decode the command or request, and handle/control input and output signals according to the command or request. In addition, processor 120 can operate independently of host computer 12 by reading sensor signals and calculating appropriate forces from those sensor signals, time signals, and force processes selected in accordance with a host command, and outputting appropriate control signals to the actuators. Suitable microprocessors for use as local microprocessor 120 include the Immersion Touchsense Processor from Immersion Corporation, the 8X930AX by Intel Corp., the MC68HC711E9 by Motorola, or the PIC16C74 by Microchip, for example. Microprocessor 120 can include one microprocessor chip, or multiple processors and/or co-processor chips. In other embodiments, microprocessor 120 can include digital signal processor (DSP) functionality, or be other types of controllers such as control logic components, an ASIC, or a hardware state machine.

For example, in one host-controlled embodiment that utilizes microprocessor 120, host computer 12 can provide low-level force commands over bus 108, which microprocessor 120 directly transmits to the actuators. In a different local control embodiment, host computer 12 provides high level supervisory commands to microprocessor 120 over bus 108, and microprocessor 120 manages low level force control loops to sensors and actuators in accordance with the high level commands and independently of the host computer 12. In the local control embodiment, the microprocessor 120 can process sensor signals to determine appropriate output actuator signals by following the instructions of a "force process" that may be stored in local memory 124 and includes calculation instructions, conditions, formulas, force magnitudes, or other data. The force process can command distinct force sensations, such as vibrations, textures, jolts, or even simulated interactions between displayed objects. The host can send the local processor 120 force sensation parameters to store in local memory, or can clear other force sensations to load new force sensations in memory. Force feedback used in such embodiments is described in greater detail in co-pending patent application Ser. No. 09/305,872, and U.S. Pat. No. 5,734,373, both of which are incorporated by reference herein. Other embodiments may not include a local microprocessor 120 but can use state machines or other logic circuitry to process host commands; or, the host computer can provide low-level commands directly to the actuators or actuator interface of the device 10 without any such components.

A local clock 122 can be coupled to the microprocessor 120 to provide timing data, similar to system clock 104 of host computer 12; the timing data might be required, for example, to compute forces output by actuators 70. Local memory 124, such as RAM and/or ROM, is preferably coupled to microprocessor 120 to store instructions for microprocessor 120 and store temporary and other data.

Sensor interface 126 may optionally be included in device 10 to convert sensor signals to signals that can be interpreted by the microprocessor 120 and/or host computer 12. Such circuits, or equivalent circuits, are well known to those skilled in the art. Alternately, microprocessor 120 or host computer 12 can perform these interface functions. Actuator interface 128 can be optionally connected between the actuators of device 10 and microprocessor 120 to convert signals from microprocessor 120 into signals appropriate to drive the actuators. Interface 128 can include power amplifiers, switches, digital to analog controllers (DACs), and other components well known to those skilled in the art. Power supply 130 can optionally be coupled to actuator interface 128 and/or the actuators 70 to provide electrical power. Alternatively, actuators and other components can draw power from the bus 108 (such as USB) from the host computer. Or, power can be stored and regulated by device 10 and used when needed to drive actuators 70.

Sensors 72 sense the position, motion, and/or other characteristics of particular controls of device 10 as described above. Sensors 72 provide signals to microprocessor 120 including information representative of those characteristics. The sensor 72 or sensor interface 126 can optionally provide sensor signals directly to computer 12 as shown by busses 109a and 109b. Example of sensors suitable for embodiments described herein are digital rotary optical encoders, Hall effect sensors, linear optical encoders, analog sensors such as potentiometers, optical sensors such as a lateral effect photo diode, velocity sensors (e.g., tachometers) and/or acceleration sensors (e.g., accelerometers), photodiode sensors, photoresistor sensors, capacitive sensors, etc. Furthermore, either relative or absolute sensors can be employed.

Actuators 70 transmit forces to manipulandum 18 in one or more directions along one or more degrees of freedom in response to signals output by microprocessor 120 and/or host computer 12, i.e., they are "computer controlled." Actuators 70 can be of a variety of types, including active actuators and passive actuators. Active actuators include linear current control motors, stepper motors, voice coils, torquer, hydraulic or pneumatic actuators, etc. Passive actuators are not directly applicable for use alone with the present invention since they do not by themselves cause motion of the manipulandum 18, but passive actuators can be used in conjunction with the active actuators to apply a resistance to the motion of the manipulandum 18, such as magnetic particle brakes, friction brakes, or pneumatic/hydraulic passive actuators. Actuators 70 can be rotary or linear actuators.

The manipulandum 18 can be a variety of different objects or manipulandums that are manipulated by a user and which can receive force feedback. For example, manipulandum 18 can be the finger joystick described above, or other objects in other embodiments, such a mouse, steering wheel, large joystick, trackball, etc. The housing of the entire device 10 can also be actuated.

Other input devices 134 can optionally be included in device 10 and send input signals to microprocessor 120 and/or host computer 12. Such input devices can include buttons, dials, knobs, switches, voice recognition hardware (with software implemented by host 12), or other input mechanisms as described above.

Motion Deadman Operation

The deadman operation of the present invention allows output forces on a manipulandum, such as manipulandum 18, to be changed in accordance with user physical contact and interaction with the manipulandum. The present invention provides a force feedback device with features associated with a deadman sensor, allowing the deactivation or reduction of forces when the user is not contacting the device. The present invention provides this functionality without having to provide a separate deadman switch or sensor. The present invention also allows the scaling of force output in accordance with the degree of user contact with the manipulandum, leading to a more compelling user experience of force feedback.

These types of modification of output forces can be important in some embodiments of force feedback devices, such as high bandwidth/low inertia systems where the user interaction represents a significant change in the system impedance. An (adaptive) control system problem is presented where the system should be provided with high gains of forces and high-magnitude stiffness for a compelling user experience, but the high gains and stiffness can cause instabilities and disconcerting forces in many situations.

A first aspect of the invention is the detection of the level or degree of user interaction with the manipulandum. The process of the present invention must be aware that the user is interacting with the manipulandum before any action can be taken. A second aspect is the modification or adjustment of the force output of the force feedback device based on the detected level of user interaction.

It should be noted that a detection and adjustment process described herein can be performed for all of the possible motion of the manipulandum of the device 10, or a distinct detection/adjustment process can be performed for each axis or degree of freedom of the device.

Detection of User Interaction

Any of the below methods can be used to detect or measure the user contact with the manipulandum. In some embodiments, two or more of the below processes can be implemented in a single force feedback system to provide a more robust detection of user contact and appropriate modification of forces.

Figure 3:
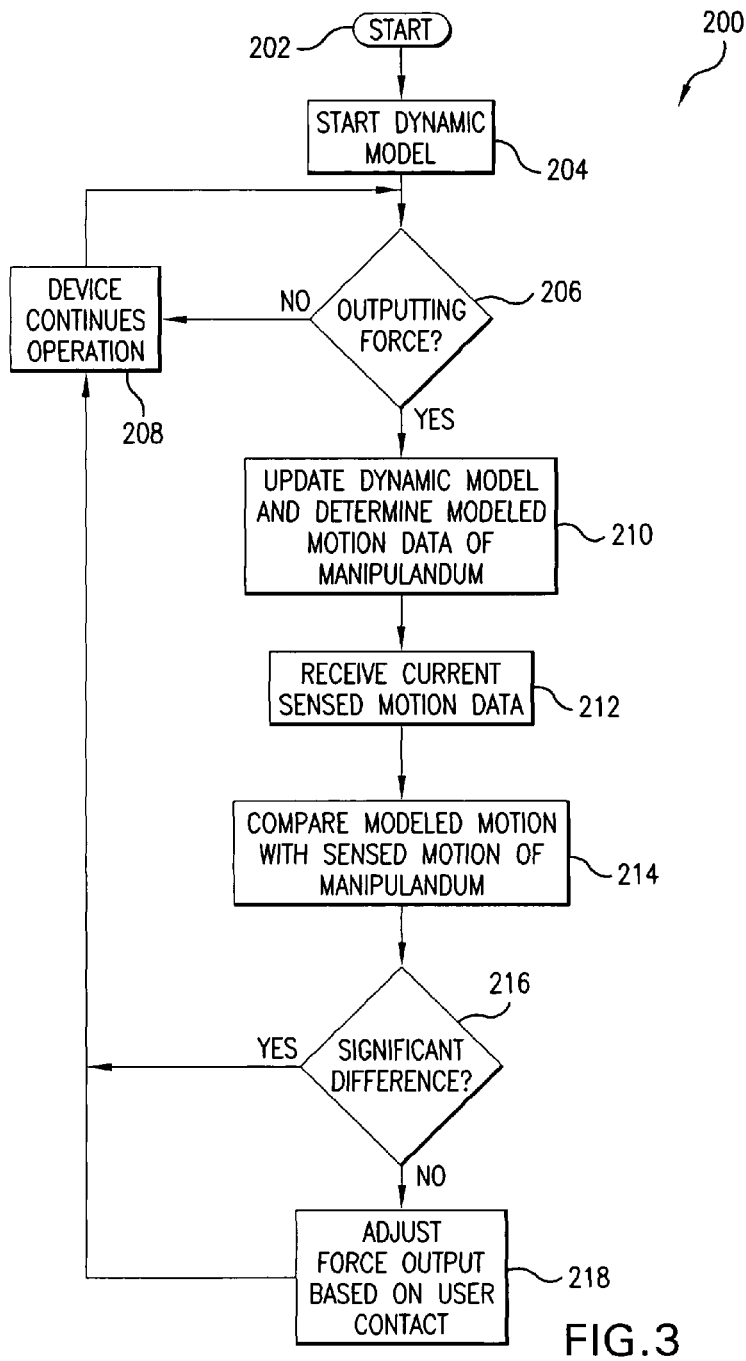
FIG. 3 is a flow diagram illustrating a first method of the present invention for detecting the user interaction with the manipulandum of the force feedback device.

FIG. 3 is a flow diagram illustrating a first method 200 of the present invention for detecting the user interaction with the manipulandum 18 of the force feedback device. The method 200 (or the other methods described herein) can be implemented by a local microprocessor 102 in an appropriate embodiment; alternatively, the host computer 12 can perform the method or parts of the method. The steps of the methods described herein can be stored and implemented as firmware or software code or instructions in a memory or other computer-readable medium, such as magnetic disk (hard drive, floppy disk, etc.), optical disc (CD-ROM, DVD-ROM), etc., and/or as hardware circuitry (logic gates, etc.). The method begins at 202, and in step 204 a dynamic model is initiated. The dynamic model is a model of the motion of the manipulandum of device 10 when the manipulandum is not contacted by a user, as established from prior testing of the characteristics of the device. For example, the electronics and mechanical systems of a device can be modeled by the manufacturer or designer by outputting a known force magnitude and sensing the amount of motion exhibited by the manipulandum 18 in response to the force output. This test can be performed for a variety of force magnitudes, directions, and types of force sensations (vector forces, vibrations, etc.) to determine how the manipulandum will behave under various force conditions without the user contacting the manipulandum. The system may alternatively be modeled purely analytically, knowing the mechanical and electrical specifications and properties of the system.

The force feedback devices may exhibit slightly different performances from one another due to variations in the mechanical and electrical systems of each device that are often unavoidable in manufacturing processes. Thus, the dynamic model of step 204 can be made to take these manufacturing variations into account. For example, each produced force feedback device can be provided with its own model, stored in non-volatile memory of the device as a look-up table and/or a generalized relationship or equation. Or, parameters similar to calibration parameters can be stored in the memory of the device. These parameters can adjust any result that is found from a generic model, thus tailoring the model to the specific device. In other, more approximate embodiments, no such tailoring for device variations is made and only a generic dynamic model is used.

The dynamic model process is started in step 204 so that a modeled position (or other motion) of the manipulandum 18 can continuously be determined using the model during device operation.

In step 206, the process checks whether the device is about to (or has already) output a force on the manipulandum 18. As described above, the device outputs a force when the local microprocessor 120 and/or the host computer 12 have commanded that one or more force sensations be output. If no force is being output, the process continues to step 208, where the device continues its standard operation, e.g. reading manipulandum position, reporting position or other values to the host computer, receiving and storing force data or other data from the host computer, etc. The process then returns to step 206. If the force feedback device is outputting a force in step 206, then the process continues to step 210, where the process updates the dynamic model and determines modeled motion of the manipulandum 18. In this step, the process can provide previous motion data of the user manipulandum 18 to the dynamic model so that the model can predict how the manipulandum should move based on the output force (if no user is touching the manipulandum). This previous motion data can be a position of the manipulandum, a velocity, an acceleration, or any other type of motion data required by the dynamic model (e.g. a history of one or more previous positions of the manipulandum, range limits to a workspace, etc.). Using the previous motion data, the modeled motion of the manipulandum is determined, such as a modeled current position, current velocity, and/or other motion characteristic.

In step 212, the process receives the current motion data from the sensors describing actual manipulandum motion, such as current manipulandum position and/or manipulandum velocity. If the process 200 is running on a local microprocessor of the device, then process 200 will likely already have access to this motion data since the local processor must typically report manipulandum position data to the host computer.

In next step 214, the process compares the modeled motion with the actual sensed motion of the manipulandum, where the modeled motion is provided by the dynamic model and the sensed motion is provided in step 212 from the sensors. Thus, if manipulandum positions are used, the process compares the modeled position and the actual position. In step 216, the process checks if there is a significant difference between the modeled and actual motion of the manipulandum. Here, a "significant" difference may be indicated by designating a threshold range; if the motions are close to each other within the threshold range, then they are considered equal and there is no significant difference. This shows that the manipulandum has behaved similarly to the modeled, non-contacted manipulandum in response to the force output, and indicates that the user is not currently contacting the manipulandum. Thus, if there is no significant difference in step 216, then the process continues to step 218, where an adjustment to the output forces is made, e.g., the forces can be stopped or adjusted. This is described in greater detail with respect to FIGS. 7-9, below. The process then returns to step 208. If there is a significant difference in modeled and actual motion of the manipulandum, then the user is likely to be inhibiting the motion of the manipulandum, and is thus contacting the manipulandum. The forces should then be output normally, and the process returns to step 208.

This embodiment thus provides a "binary" application of the present invention, where the user is either contacting the manipulandum or is not. The process makes no force adjustment if a significant difference between modeled and actual motions is found, and stops forces if no significant difference is detected, i.e. it is assumed that the user is not contacting the device if no significant difference is found. However, in some cases it may be desirable to determine the degree or level of user interaction rather than a simple binary result. Thus, in other embodiments of method 200, a variable degree of user contact can be determined by using the magnitude of the difference as an indication of degree of user contact, and by compensating the forces accordingly, e.g. proportionally to the difference. This allows far more than the two states of "contacting" and "not contacting", e.g. the degrees may include "heavy contact," "medium contact," "light contact," and "no contact." Such a method uses the fact that as the user contacts the manipulandum with more or less stiffness, the dynamics of the device motion change continuously. An embodiment that adjust forces using such an indication of degree of user contact is described with reference to FIG. 9.

Figure 4:
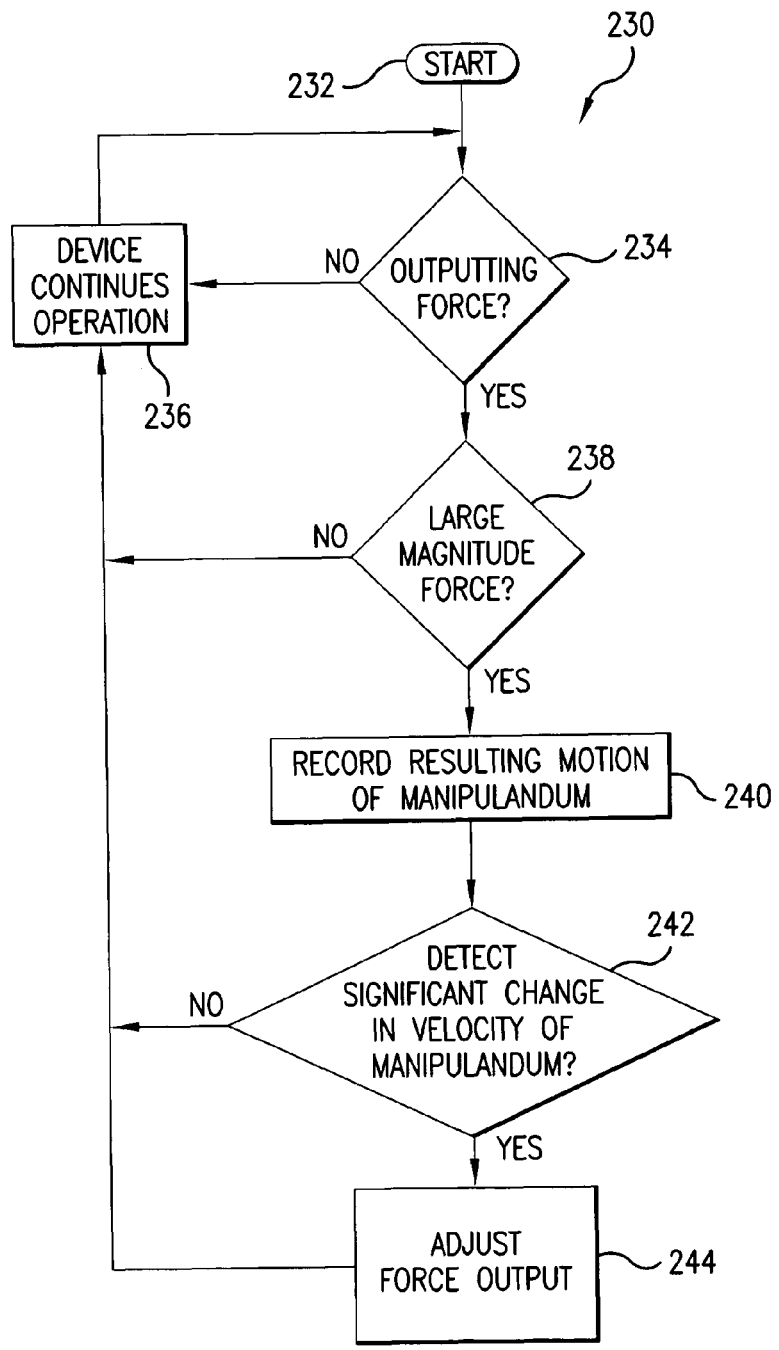
FIG. 4 is a flow diagram illustrating a second method of the present invention for detecting the user interaction with the manipulandum of the force feedback device.

FIG. 4 is a flow diagram illustrating a second method 230 of the present invention for detecting the user interaction with the manipulandum 18 of the force feedback device. In this method, only particular situations are examined to determine if the user is interacting with or contacting the manipulandum. The process begins at 232, and at step 234, the process checks whether the device is outputting a force, similar to step 206 described above. If the device is not outputting a force, the process continues to step 236 where the device continues operation, and returns to step 234. If the device is outputting a force in step 234, then in step 238 the process checks whether the force is a large magnitude force, where a large magnitude force can be defined as a force having a magnitude over a predetermined threshold. The threshold magnitude is preferably selected such that the large forces cause significant and consistently measurable velocity changes of the manipulandum when the user is not contacting it.

If the force to be output does not have a large magnitude, then the process continues to step 236. If the forces do have a large magnitude, then in step 240 the process records the motion of the manipulandum resulting from the large force. The process can record a history of at least two most recent positions and determine velocities from that data (and timing data), or velocities can be otherwise determined and recorded (tachometer, differentiation circuits, etc.). In next step 242, the process checks whether there is a significant change in the velocity of the manipulandum.

To check this velocity change, the process can examine at least two of the manipulandum velocities that have been recorded in step 240 over time, or can derive velocities from positions and time data. This history of recorded positions and the time interval between these recordings can be used to determined manipulandum velocity. In other embodiments, the velocity of the manipulandum may already be determined by the device or other component, such as by a dedicated "haptic accelerator" processor, by velocity sensors, etc. A significant change in velocity can be determined by checking for a change in velocity that is over a predetermined threshold velocity.

This check for the change in velocity is the equivalent of checking for significant acceleration of the manipulandum (acceleration can be checked in other ways in other embodiments, e.g. by using accelerometers, differentiation circuits, etc.). Acceleration is checked because of the relationship F=ma. If the user is in contact with the manipulandum, two general events occur: the effective force is reduced because the user applies a resistive force to the manipulandum, and the effective mass is increased by the mass of the user's finger/hand/etc. that is contacting the manipulandum. Thus, since acceleration will be low when the user is contacting the manipulandum (since F is lower), the acceleration will be higher when the user is not contacting the manipulandum.

If a significant acceleration or change in velocity is found in step 242, then the indication is that the user is not contacting the manipulandum, allowing the manipulandum to be moved further and faster than if the user were contacting it. Thus, the forces should be adjusted in step 244 to take into account the lack of user contact, e.g. the forces can be stopped, which is described in greater detail below with respect to FIGS. 7-9. If no significant change in velocity is found in step 242, then it is likely that the user is contacting and inhibiting the motion of the manipulandum, preventing the significant velocity changes. Thus, the forces need not be adjusted, and the process returns to step 236.

This embodiment also provides a "binary" determination of user contact or lack thereof, where the process makes no force adjustment if no significant change in velocity is found, and stops all forces if a significant change in velocity is found. In other embodiments of method 230, a variable degree or level of user contact can be determined by using the determined velocity as an indication of degree of user contact, and by compensating the forces accordingly. An embodiment that adjust forces using such an indication of degree of user contact is described with reference to FIG. 8.

Figure 5:
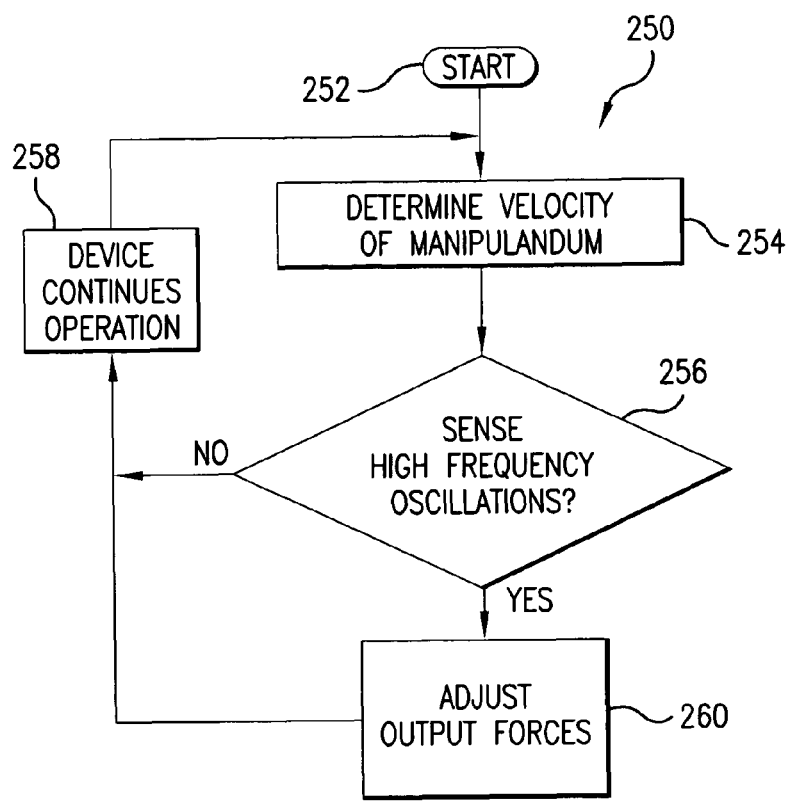
FIG. 5 is a flow diagram illustrating a third method of the present invention for detecting the user interaction with the manipulandum of the force feedback device.

FIG. 5 is a flow diagram illustrating a third method 250 of the present invention for detecting the user interaction with the manipulandum 18 of the force feedback device. In this method, the process does not use any information about the force output of the device, but only looks at manipulandum motion. This method can be effective for use in force feedback systems where the device has a very high mechanical and electrical bandwidth and a very low inertia, such as the force feedback pad 20 of FIG. 1 or a finger joystick of a gamepad. In these types of systems, the impedance of the user interacting with the manipulandum dramatically changes system dynamics. To provide a compelling experience for the user who is fully grasping the manipulandum, the gains and stiffnesses of the simulated force effects need to be increased significantly. As a result of using these increased force magnitudes, the control gains tend to be too large for the system to remain stable when the user is not interacting with the manipulandum. The manipulandum will tend to vibrate from the control output forces, e.g., one force may cause the manipulandum to cross an origin position and move to the other side of the origin position, where a spring or other resistive force is encountered that causes the manipulandum to move back across the origin position, where a resistive force is again encountered, and so on, resulting in rapid oscillations.

In other cases, high frequency oscillations of a manipulandum can result from a commanded force sensation, such as a vibration having a high frequency. This method thus allows for the stopping or reduction of forces during such commanded force sensations. This is desirable in some embodiments since users may find high-magnitude, high-frequency forces to be disconcerting.

The oscillations of the manipulandum resulting from instability or commanded sensations tend to be at a higher frequency than oscillations a user can reasonably be expected to produce by manually moving the manipulandum. Therefore, the approximate level of a user-manipulandum interaction in these systems can be detected by checking for oscillations of the device at a higher frequency than oscillations the user could be expected to manually produce.

The process 250 begins at 252, and in step 254, the process determines the current velocity of the manipulandum to determine the frequency of oscillation of the manipulandum. Detecting the velocity of the device is preferred in this embodiment since the manipulandum frequency can be determined more quickly using velocities than manipulandum positions. For example, to detect frequency using position, a history of motion of the manipulandum can be stored over a significant period of time; in some embodiments, this may be appropriate. However, the velocity of the manipulandum can alternatively be determined. The manipulandum velocity must pass through a zero point two times for each oscillation period, as the oscillation changes direction. By checking for zero-crossing transitions of the manipulandum and recording the maximum and minimum velocity values between these crossings, the magnitude and frequency of any oscillation on the device can be detected. This is preferably performed in step 252 to determine manipulandum velocity. Checking for motion zero crossings is well known to those skilled in the art.

In step 256, the process checks whether the motion detected in step 254 qualifies as high frequency oscillations. Preferably, a predetermined threshold frequency is used, where frequencies over the threshold qualify as "high" frequencies. If the detected frequency is not a high frequency, then the process continues to step 258, where the device continues operation, and then returns to step 254. If in step 256 the detected frequency is a high frequency, then the process continues to step 260, where the process adjusts force output accordingly. Embodiments for such adjustment are described in FIGS. 7-9, below.

As in the embodiments of FIGS. 3 and 4, this embodiment also provides a "binary" determination of user contact, where the process makes no change to forces if frequencies under the threshold are detected and any user contact is assumed. In other embodiments of method 250, a variable degree of user contact can be determined by using the determined frequency (and/or velocity or amount of displacement) as an indication of degree of user contact, and by compensating the forces accordingly. For example, a higher frequency (or velocity) may indicate less user contact, while a lower frequency may indicate greater user contact. An embodiment that adjusts forces using such an indication of degree of user contact is described for FIG. 9.

The process of FIG. 5 can detect a high frequency of manipulandum oscillations. Some oscillations may result from the instabilities explained above. Other oscillations, however, may result from the application of a force sensation on the user object. For example, a vibration force sensation having a high frequency will cause the manipulandum to oscillate at a high frequency. The process of FIG. 5 will sense any type of oscillation and adjust the magnitude of the force sensation (either stop the force or reduce the magnitude). In a preferred embodiment, the process will lower the magnitude of the oscillations, rather than stop all forces, since the user may still be contacting the manipulandum even when high frequency oscillations are detected. In other embodiments, all forces can be stopped upon detecting the high frequency oscillations, but it is preferred that the method have an additional check to determine the source of the oscillations. If a high-frequency force sensation like a vibration is being output, the process knows that the oscillations are caused by the force sensation, and can reduce the magnitude appropriately. If no vibration-like forces are being output, the method knows that instabilities are the cause of the oscillations, and can stop all force output.

Figure 6:
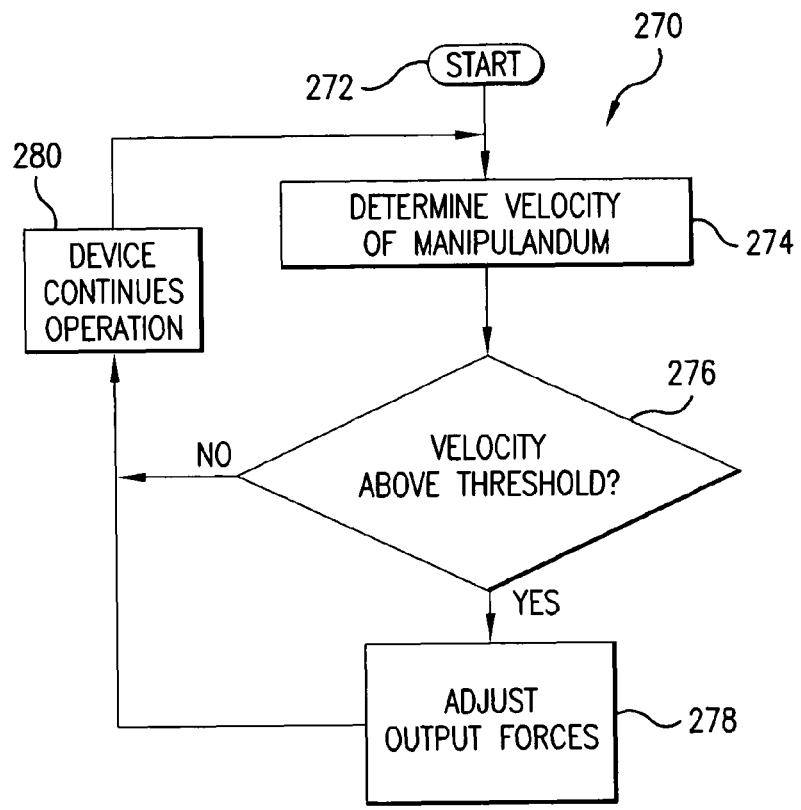
FIG. 6 is a flow diagram illustrating a fourth method of the present invention for detecting the user interaction with the manipulandum of the force feedback device.

FIG. 6 is a flow diagram illustrating a fourth method 270 of the present invention for detecting the user interaction with the manipulandum 18 of the force feedback device. This process is similar to the process of FIG. 5, except that velocity of the manipulandum rather than frequency of oscillations are checked. The process begins at 272, and in step 274, the velocity of the manipulandum is determined. This step is similar to step 254 of FIG. 5. In next step 276, the process checks whether the determined velocity is above a predetermined threshold. The threshold is set at a high velocity which the user usually will not be able to achieve by moving the manipulandum manually. This process thus assumes that if the manipulandum is moving very fast, it is due to the actuators and not the user, e.g. due to the instabilities in the system described with reference to FIG. 5 or due to the force output on the manipulandum being too high. Thus, if high velocity is detected, output forces are adjusted in step 278 according to one of the processes of FIGS. 7-9. In a preferred embodiment, forces are reduced in magnitude rather than stopped completely, as for the process of FIG. 5; or forces can be stopped only if the high velocity is due to instabilities. If the velocity is not above the threshold, or after the forces are adjusted, the device continues normal operation at step 280 and can return to step 274. Other embodiments can detect an acceleration of the manipulandum.

Adjustment of Output Forces

The following figures illustrate various methods for stopping or otherwise adjusting the force output on the manipulandum after it has been determined by one of the processes described above that the user is not contacting or has less than full contact with the manipulandum. The scaling down or stopping of forces reduces excessive motion of the manipulandum and/or reduces excessive force on the user.

Figure 7:
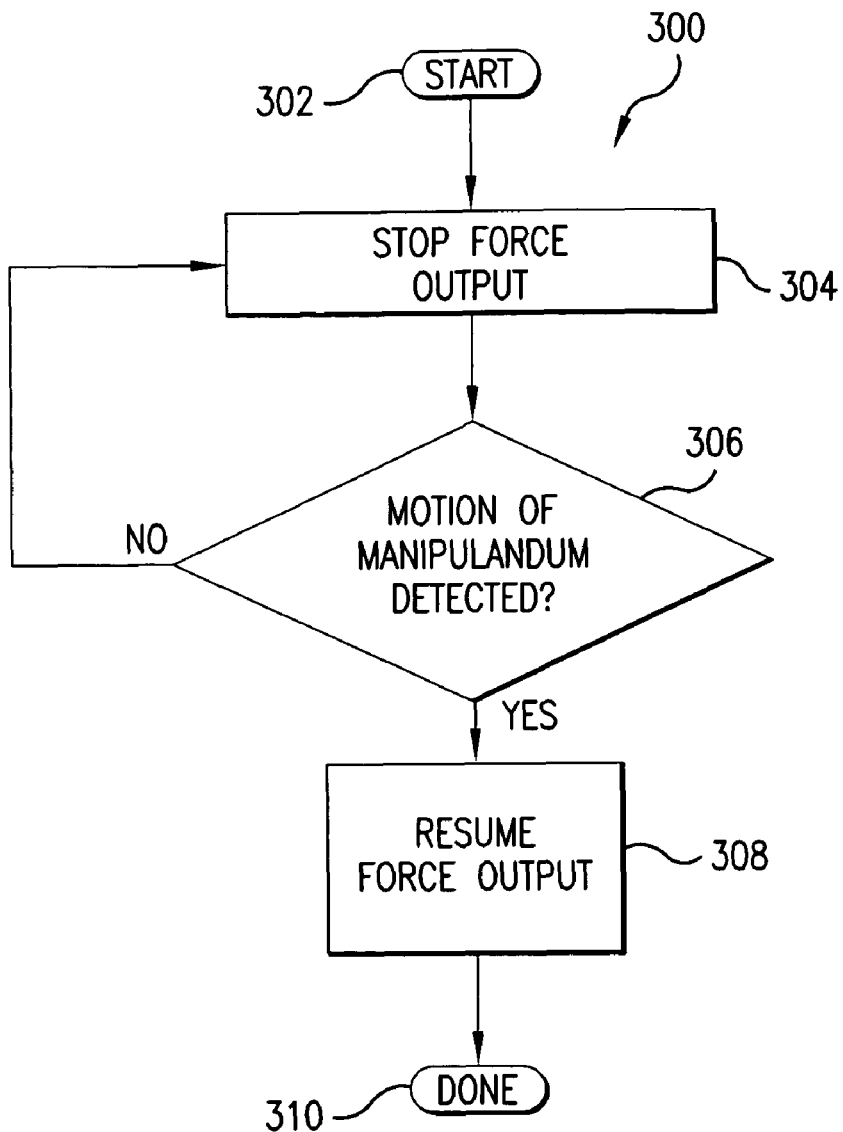
FIG. 7 is a flow diagram illustrating a first method of the present invention for adjusting the output forces once the removal of user contact with the manipulandum has been detected.

FIG. 7 is a flow diagram illustrating a first method 300 for adjusting the output forces once the removal of user contact with the manipulandum has been detected in any of the methods of FIGS. 3-6. The process assumes that no interaction of the user and the manipulandum has been detected, and thus the forces should be removed to prevent moving the manipulandum when under no user control. In this method, the adjustment made is the stoppage of all force output. A local microprocessor and/or the host computer can implement the method 300 (or the methods of FIGS. 8 and 9).

The process begins at 302, and in step 304, the process stops all force output from the actuator(s) of the device 10. In step 306, the process checks whether motion of the manipulandum is detected. This step instructs the process whether to start force output again after previously stopping force output. Preferably, this process checks for any motion of the manipulandum, regardless of how small or large. Alternatively, the process can check for a minimum amount of motion, e.g. movement of the manipulandum greater than a threshold minimum distance. If no motion is detected, the user is assumed to not be contacting the manipulandum and the process returns to step 304 to continue to stop force output and check for motion (and the device continues operation, such as receiving data from host computer, sending button data to host computer, etc.).

If motion of the manipulandum is detected, then in step 308 the process resumes force output. Thus, any motion detected is interpreted as indicative of user contact with the manipulandum, since there is no force output to cause such motion at step 306. Force output is preferably resumed at a point which assumes that forces had been output during the time period in which forces were stopped. For example, if a force sensation having a specified length, such as a vibration, is output and stopped at time t=2, and forces are then resumed playing at time t=5, then the forces resume playing at the t=5 portion of the vibration sequence. After step 308, the process is complete at 310 and normal operation of the device continues as in any of the methods of FIGS. 3-6.

In some embodiments, the output forces can be gradually ramped back up in magnitude when resuming output in step 308 (or in equivalent steps in other methods described herein). This may reduce some of the disconcerting effect that abrupt resumption of forces may have on the user. The forces can be ramped up linearly from a zero magnitude (or from whatever lower magnitude was used) to the full desired output magnitude, or may be ramped up according to some other desired formula or relationship. In those embodiments allowing detection of a variable degree of user contact, the ramp-up of forces can be made more slowly or gradual if the user is only lightly contacting the manipulandum, while the ramp-up can be made more abrupt if the user is more strongly contacting the manipulandum. This may prevent the manipulandum from escaping a user's light grasp when forces are reapplied too abruptly.

Figure 8:
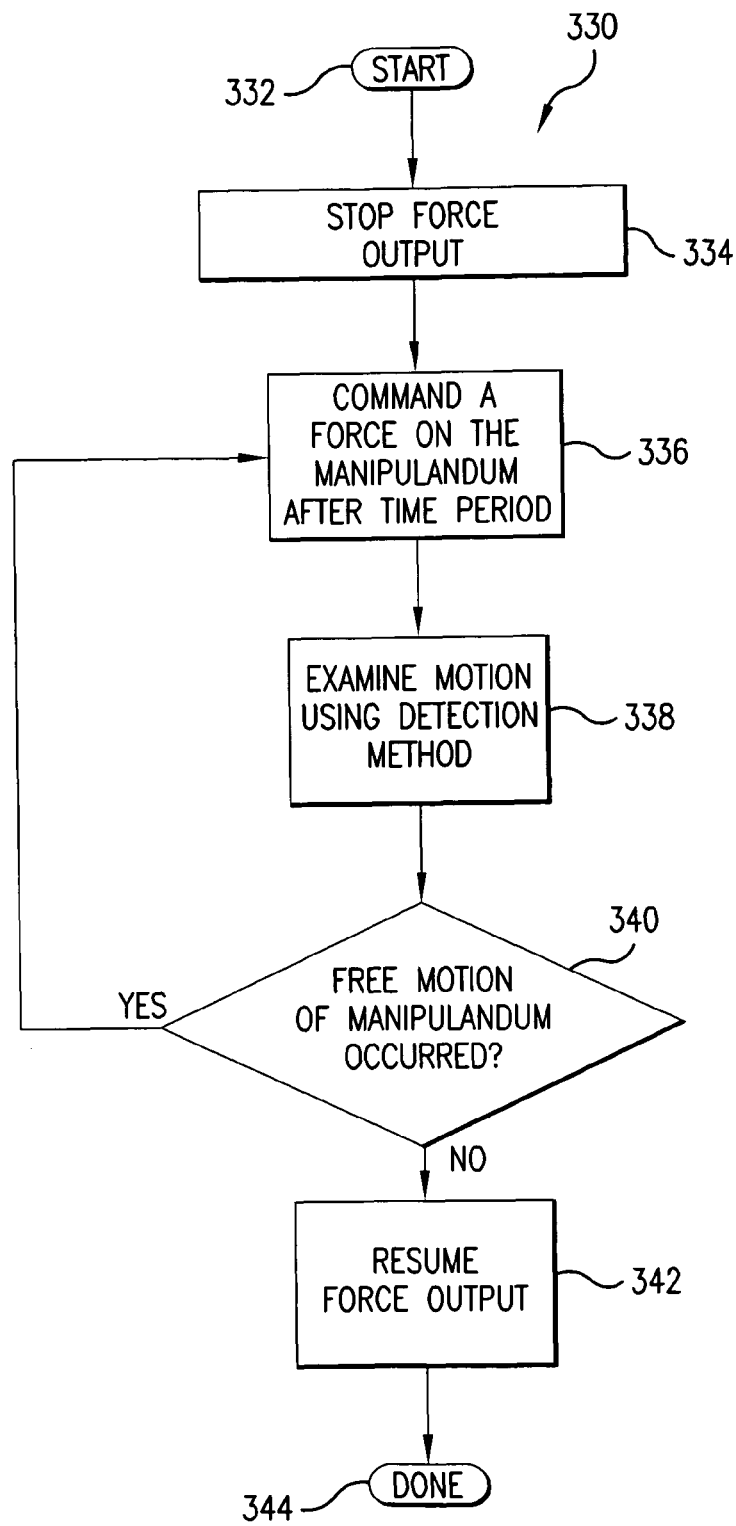
FIG. 8 is a flow diagram illustrating a second method of the present invention for adjusting the output forces once the removal of user contact with the manipulandum has been detected.

FIG. 8 is a flow diagram illustrating a second method 330 for adjusting the output forces once the removal of user contact is detected. One potential problem with the method of FIG. 7 is that any movement of the manipulandum is assumed to indicate user contact, when such user contact may not be actual, e.g. the movement may only be caused by the user jolting the housing of the device instead of contacting the manipulandum. In method 330, user contact is usually detected with more certainty. This method stops all forces when the lack of user contact is detected, similar to the method of FIG. 7.

The process begins at 332, and in step 334, the process stops all force output from the actuator(s) of the device 10. In step 336, the process commands a force on the manipulandum after a predetermined time period. The force can be a single jolt or similar force in a particular direction. The purpose of the force is to cause motion of the manipulandum and determine whether the user is still not contacting it. Thus, in the next step 338, the process examines the resulting motion of the manipulandum using a detection method employed to detect user contact; preferably, any of the methods as described in FIGS. 3-6 can be used (with the exception of the "adjusting" steps in those processes). Furthermore, a different method can be used in process 330 when originally detecting the user contact, if desired.

In step 340, the process checks whether "free" (not contacted by the user) motion of the manipulandum occurs using the detection method, e.g., if there is a significant difference between modeled and actual positions, a significant change in velocity, or a high frequency of oscillation as described in the embodiments above. If the manipulandum has moved as if not contacted by the user, then the process returns to step 336 to command another force on the manipulandum after the predetermined time period has passed (and the device can be continuing to perform other normal operations). If the manipulandum has reduced movement as if contacted by the user and is detected as such, then the process continues to step 342 to resume the force output on the manipulandum, similar to step 308 described above. The process is then complete at 344 and normal operation of the device continues as shown in the methods of FIGS. 3-6.

One possible problem with the method 330 in some embodiments is that the force output on the manipulandum to test for user contact can be disconcerting to the user, either when the user is contacting the user object (the user feels a force not correlated with any host computer event) or when the user is not contacting it (the manipulandum periodically moves by itself).

Figure 9:
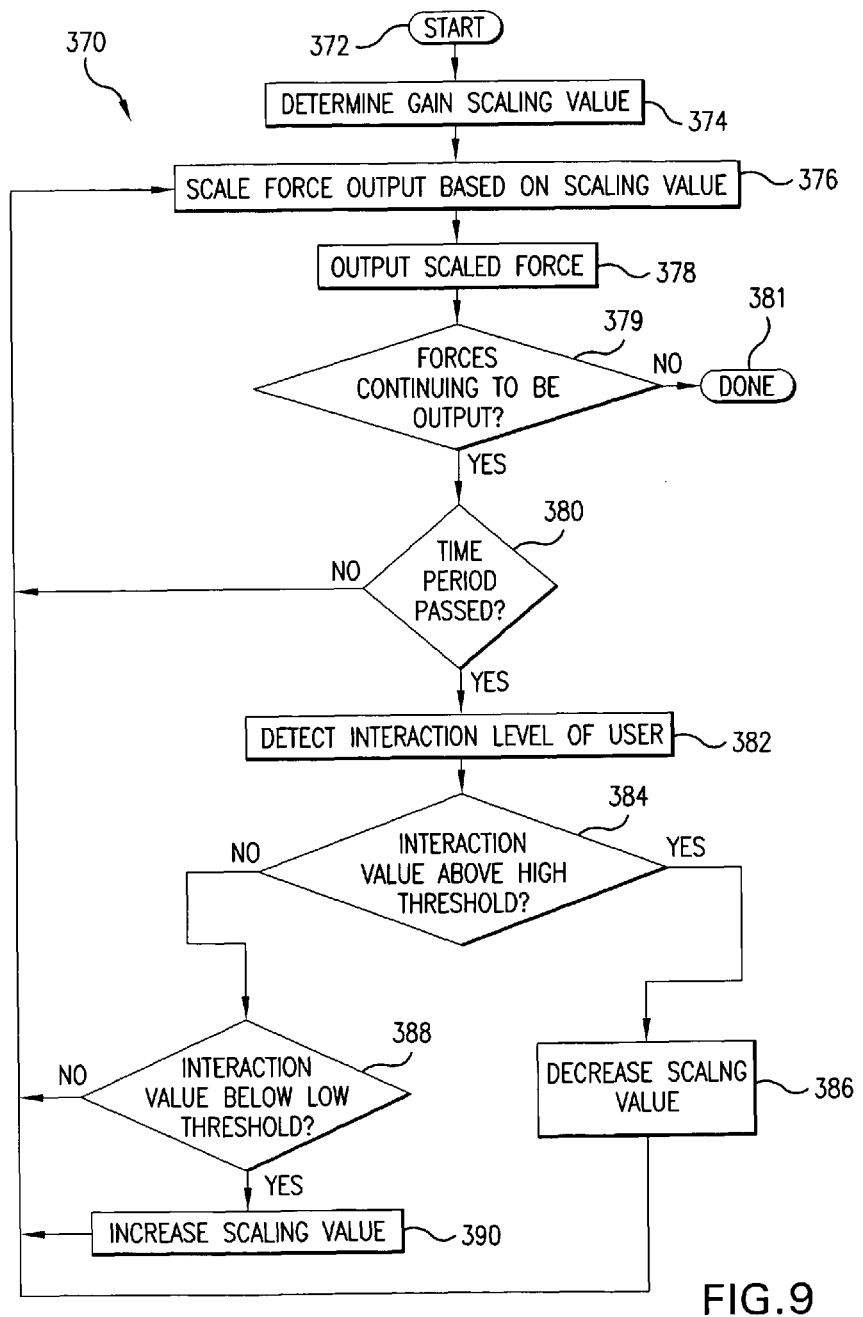
FIG. 9 is a flow diagram illustrating a third method of the present invention for adjusting the output forces once a different degree of user contact with the manipulandum has been detected.

FIG. 9 is a flow diagram illustrating a third method 370 for adjusting the output forces once a different degree of user contact is detected. Method 370 uses an adaptive gain scaling to scale the output forces before they are output. The forces are scaled to a particular level in accordance with the degree of user contact with the manipulandum, and the scaling can be adjusted over time based on the detected user interaction. Thus, this method is suitable for detection methods which can detect the amount of user contact in more states or degrees than the two (binary) "contacting" and "not contacting" states. For example, those methods described above which can detect a variable degree of user contact are well-suited for this process. In addition, other embodiments may use hardware components to detect a variable degree of user contact. For example, a force sensor, such as a force sensing resistor, an analog sensor, or other sensor component can be positioned in manipulandum or housing to sense the amount of force or contact of the user on the manipulandum, e.g. a sensor that senses an amount of motion or displacement of a manipulandum with respect to a base when the user applies weight or pressure to the manipulandum. Also, the method of FIG. 9 can be used with "binary" detection processes to simply reduce force magnitudes instead of turning them off.

This approach is different from traditional deadman implementations in that it does not attempt to completely eliminate the force output and motion of the manipulandum when the user is not contacting it. Instead, this method works to minimize "undesirable" and excessive motion of the manipulandum which may not be suitable for the degree of user contact. For example, if the user is only lightly contacting the manipulandum, full-magnitude forces may not be appropriate since they may feel to strong to the user. However, such full magnitude forces may provide the most compelling experience to the user when the user is firmly gripping the manipulandum.

The degree of user contact can be expressed as an "interaction value," e.g., for the purposes of this described process a higher interaction value indicates less user contact (i.e. a lower interaction level) and a lower interaction value indicates a greater amount of user contact (this scheme can be reversed in other embodiments). In addition, this described process assigns two interaction threshold levels which are used for adjusting the scaling value, as described below.

The method 370 begins at 372, and in step 374, an initial gain scaling value is set. The gain scaling value indicates the amount that the forces are to be reduced in strength. In the preferred embodiment, the initial gain scaling value is set at 1 so that full force output is provided, and is later adjusted as described below. In other embodiments, the initial gain scaling value is determined based on the degree or level of detected user interaction as detected by one of the processes described in FIGS. 3-6. Step 374 can convert the interaction value received from the detection process to a scaling value in a desired range, if appropriate.

In other embodiments, the gain scaling value can be set at a different predetermined value and need not be based on a detected variable degree of user contact. For example, one of the processes of FIGS. 3-6 might only detect whether there is user contact or no user contact. If there is no user contact, the forces can be scaled down to a predetermined low level instead of being stopped. In such a case, the scaling factor can be a predetermined value.

The process then starts a force scaling sequence where forces are scaled and updated. In step 376, the process scales the final force output based on the current gain scaling value. The final force output is a force value or magnitude that, for example, includes the summations of force values contributed by all currently-playing force sensations. This final force value is scaled in accordance with the scaling value, where the scaled force output can never be greater than its original, unsealed value (this process assumes that force sensations are normally output assuming the strongest user grip on the manipulandum and thus at their strongest level). In step 378, the scaled force is output using the actuators of the device.

In step 379, the process checks if forces are continuing to be commanded to be output by the device (or the host computer). If forces are no longer being commanded, then the process is complete at 381. The device can then continue operation and start the user interaction detection process again when forces are output, as described in the methods of FIGS. 3-6.

If forces are continuing to be commanded, the process continues to step 380, where the process checks if a predetermined time period has passed. This time period governs how often the process checks whether to update the scaling value for the forces based on a changed user contact with the manipulandum. The time period needs to be small enough so that the scaling of forces is responsive to the user's changing level of contact and/or release of the manipulandum, but large enough to allow a reasonable detection of the degree of user interaction between updates of the scaling factor. If the time period has not yet passed, the process returns to step 376 to scale the latest force output using the most current scaling value previously determined.

If the time period has passed at step 380, the process continues to step 382 to detect the current contact or interaction level (this detection can also be performed all or in part during the waiting for the time period to pass). The current interaction level is preferably determined using a detection process of FIG. 3, 4, 5, or 6. The interaction value found in step 382 is used to check in step 384 whether the interaction value is above a predetermined high interaction threshold level. This high threshold level is set at a level that indicates a significant decrease in user contact level has occurred (where higher interaction value equals lesser user contact). Thus, if the interaction value is above this high threshold, the scaling value is decreased in step 386 to compensate for the user's lesser grip on the manipulandum.

The amount of the decrease of the scaling value can be determined in different ways in different embodiments. In a preferred embodiment, the scaling value is determined using a relationship SV=HI/IV*SV, where the SV is the scaling value, HI is the high threshold level, and IV is the interaction value. This relationship causes the scaling value to drop by a large amount if the interaction value is very far above the high threshold, which prevents a large lag in the decrease of forces. In other embodiments, other methods can be used. For example, the scaling value can be decreased proportionally to the amount of increase in interaction value. Or, the size of the scaling value decrease can be otherwise based on the difference between the interaction value and the high threshold level. Or, as explained above, some embodiments may simply set the scaling value to a lower predetermined level that is found to be adequate in most situations. After the scaling value is decreased, the process returns to step 376 to scale the final force output lower based on the decreased scaling value.

If in step 384 the interaction value is not above the high threshold level, then in step 388 the process checks whether the interaction value is below a predetermined low interaction threshold level. Similar to the high threshold level, this low threshold level is set at a low enough level that indicates a significant increase in user contact level has occurred. Thus, if the interaction value is below this low threshold, the scaling value is increased in step 390 to compensate for the user's stronger grip on or contact with the manipulandum.

The amount of the increase of the scaling value can be determined in different ways in different embodiments. In a preferred embodiment, the scaling value is increased according to the relationship SV=SV+n, where SV is the scaling value and n is a predetermined value that is a much smaller value than the scaling value. Furthermore, the scaling value is preferably never increased past a value of 1 in the described embodiment. This causes the scaling value to be increased in slow increments which can add up to a large value over several iterations. This is preferred to increase stability in the device, since a large positive jump in scaling value may cause in some devices a detection of large motion, possibly causing the method to decrease the scaling value, again causing an increase in scaling value, and so on. In other embodiments, other methods can be used to increase the scaling value, as discussed above for the decrease of the scaling value in step 386. The same or different methods can be used for increasing and decreasing the scaling value. After the scaling value has been increased in step 390, the process returns to step 376 to scale the final force output higher based on the increased scaling value.

In some embodiments, the use of high and low threshold levels of steps 384-390 need not be implemented. For example, the detection process of FIG. 3, 4, 5, or 6 can simply be processed again (as in step 382) and a new scaling value based on the new interaction value then determined as in step 374, after which the force output is scaled and output as in steps 376 and 378. Preferably, large increases in scaling value are not performed due to possible instabilities caused therefrom.

While this invention has been described in terms of several preferred embodiments, it is contemplated that alterations, permutations and equivalents thereof will become apparent to those skilled in the art upon a reading of the specification and study of the drawings. For example, many different types of force feedback devices can be used with the motion deadman operation of the present invention. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. A method comprising: receiving a sensor signal that relates to a motion of a manipulandum in at least one degree of freedom; determining a degree of user contact with the manipulandum associated with the received sensor signal; and outputting a force having a magnitude in the at least one degree of freedom, the force magnitude being associated with the determined degree of user contact; wherein said determining a degree of user contact includes comparing a motion of the manipulandum with a predicted motion of the manipulandum based on a model of motion of said manipulandum.

2. A method as recited in claim 1, wherein the magnitude of the output force is substantially zero if no user contact with the manipulandum is detected.

3. A method as recited in claim 1 wherein said determining a degree of user contact includes detecting whether a user is contacting the manipulandum.

4. A method as recited in claim 3, wherein the output force is output at a first magnitude when a user is contacting the manipulandum, and is output at a second magnitude when a user is not contacting the manipulandum.

5. A method as recited in claim 1, further comprising changing the force magnitude based on the degree of user contact.

6. A method as recited in claim 1, wherein said determining a degree of user contact includes determining a velocity of the manipulandum in at least one degree of freedom, wherein said force magnitude is adjusted if a change in said velocity is determined to be outside a predetermined range.

7. A method as recited in claim 1, wherein the magnitude of the output force is adjusted if high frequency oscillations of the manipulandum in the at least one degree of freedom are detected.

8. A method as recited in claim 1, wherein the magnitude of the output force is adjusted if a velocity of the manipulandum in the at least one degree of freedom is detected above a predetermined threshold.

9. A method as recited in claim 1, further comprising applying a test force to the manipulandum and examining a test motion of the manipulandum resulting from the test force.

10. A method as recited in claim 9, wherein the test force is applied periodically.

11. A method as recited in claim 1, wherein the force output is based on a host command received from a host computer.

12. An apparatus comprising: a manipulandum that is moveable in at least one degree of freedom; a movement-sensor coupled to said manipulandum; a force-feedback actuator coupled to said manipulandum; and a processor coupled to said force-feedback actuator and to said movement sensor; and, a memory coupled to said processor, said memory storing instructions to receive sensor signals that relate to a motion of a manipulandum in at least one degree of freedom, determine a degree of user contact with the manipulandum associated with the received sensor signals, and output a force in the at least one degree of freedom, the force magnitude being associated with the determined degree of user contact; wherein said determine a degree of user contact includes comparing a motion of the manipulandum with a predicted motion of the manipulandum based on a model of motion of said manipulandum.

13. Processor-executable code comprising: code to receive a sensor signal that relates to a motion of a manipulandum in at least one degree of freedom; code to determine a degree of user contact with the manipulandum associated with the received sensor signal; and code to output a force in the at least one degree of freedom, the force magnitude being associated with the determined degree of user contact; wherein said code to determine a degree of user contact includes code to compare a motion of the manipulandum with a predicted motion of the manipulandum based on a model of motion of said manipulandum.

14. The processor-executable code of claim 13, further comprising code to output a force of magnitude that is substantially zero if no user contact with the manipulandum is detected.

15. The processor-executable code of claim 13, wherein said code to determine a degree of user contact includes code to determine whether the user is contacting the manipulandum.

16. The processor-executable code of claim 15, wherein said code to output a force includes code to output at a force at a first magnitude when a user is contacting the manipulandum, and code to output a force at a second magnitude when a user is not contacting said manipulandum.

17. The processor-executable code as recited in claim 13, further comprising code to change the force magnitude based on the degree of user contact.

18. The processor-executable code as recited in claim 13, where said code to determine a degree of user contact includes code to determine a velocity of the manipulandum in at least one degree of freedom, and code to adjust the force magnitude if a change in said velocity is determined to be outside a predetermined range.

19. The processor-executable code as recited in claim 13, further comprising code to adjust a magnitude of the output force if high frequency oscillations of the manipulandum are detected.

20. The processor-executable code as recited in claim 13, further comprising code to adjust a magnitude of the output force if a velocity of the manipulandum in said at least one degree of freedom is determined to be above a predetermined threshold.

21. The processor-executable code as recited in claim 13, further comprising code to apply a test force to the manipulandum and code to examine a test motion of the manipulandum resulting from the test force.

22. The processor-executable code as recited in claim 21, wherein the test force is applied periodically.

23. The processor-executable code as recited in claim 13, wherein said force output is based on a host command received from a host computer.

* * * * *